(12) United States Patent  (10) Patent No.: US 8,320,122 B2
Liu  (45) Date of Patent: Nov. 27, 2012

(54) LATCHING DEVICE AND ELECTRONIC DEVICE USING THE SAME

(75) Inventor: Bao-Shuai Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 420 days.

(21) Appl. No.: 12/646,954

(22) Filed: Dec. 23, 2009

(65) Prior Publication Data

US 2010/0177468 A1   Jul. 15, 2010

(30) Foreign Application Priority Data

Jan. 15, 2009  (CN) .......................... 2009 1 0300196

(51) Int. Cl.
*H05K 5/00* (2006.01)
*H05K 7/00* (2006.01)

(52) U.S. Cl. .............................. 361/679.56; 361/679.58

(58) Field of Classification Search ............. 361/679.56, 361/679.58
See application file for complete search history.

(56) References Cited

U.S. PATENT DOCUMENTS

| 5,895,729 A * | 4/1999 | Phelps et al. ................... 429/97 |
| 6,660,427 B1 * | 12/2003 | Hukill et al. ................... 429/97 |
| 2007/0015477 A1 * | 1/2007 | Tu et al. ........................ 455/128 |

* cited by examiner

*Primary Examiner* — Anthony Haughton
(74) *Attorney, Agent, or Firm* — Altis Law Group, Inc.

(57) ABSTRACT

A latching device applied in an electronic device includes a battery cover and a main body. The latching device includes an elastic member mounted on the battery cover facing the main body and a latching member slidably connected to the battery cover. The latching member includes an operation portion and at least one hook portion. The operation portion is exposed to users for sliding the latching member, and the hook portion is for hooking the main body when the battery cover covers the main body. When the battery cover is pressed to cover the main body, the operation portion is pushed to slide the latching member until the latching member resists the elastic member, and when the battery cover covers the main body, the push of the operation portion is removed, thus the elastic member resumes its natural state, and the at least one hook portion hooks the main body.

9 Claims, 6 Drawing Sheets

LATCHING DEVICE AND ELECTRONIC DEVICE USING THE SAME

BACKGROUND

1. Technical Field

The present disclosure relates to latching devices and electronic devices and, particularly, to an electronic device using a latching device.

2. Description of Related Art

A latching structure is generally used to engage a battery cover with a housing of a portable electronic device such as a mobile phone. The latching assembly usually includes a pair of hooks formed at one end of the battery cover and a locking pin protruding from the other opposite end of the battery cover. Accordingly, a pair of grooves is defined in one end portion of a backside of the housing of the mobile phone, and a locking hole is defined in the other opposite end portion of the backside of the housing. In assembly, the hooks of the battery cover are firstly inserted into the grooves of the housing, respectively. Then, the battery cover is pressed to the housing until the locking pin of the battery cover is inserted into the locking hole of the housing. The latching assembly is simple in structure, and the engagement between the battery cover and the mobile phone is firm. However, during disassembly, great effort is needed to remove the battery cover from the housing, which makes the battery cover susceptible to damage. For a similar reason, it is inconvenient for a user to replace a battery in the housing of the mobile phone.

BRIEF DESCRIPTION OF THE DRAWINGS

The components of the drawings are not necessarily drawn to scale, the emphasis instead being placed upon clearly illustrating the principles of a latching device and an electronic device using the same. Moreover, in the drawings, like reference numerals designate corresponding parts throughout several views.

DETAILED DESCRIPTION

Figure 1:
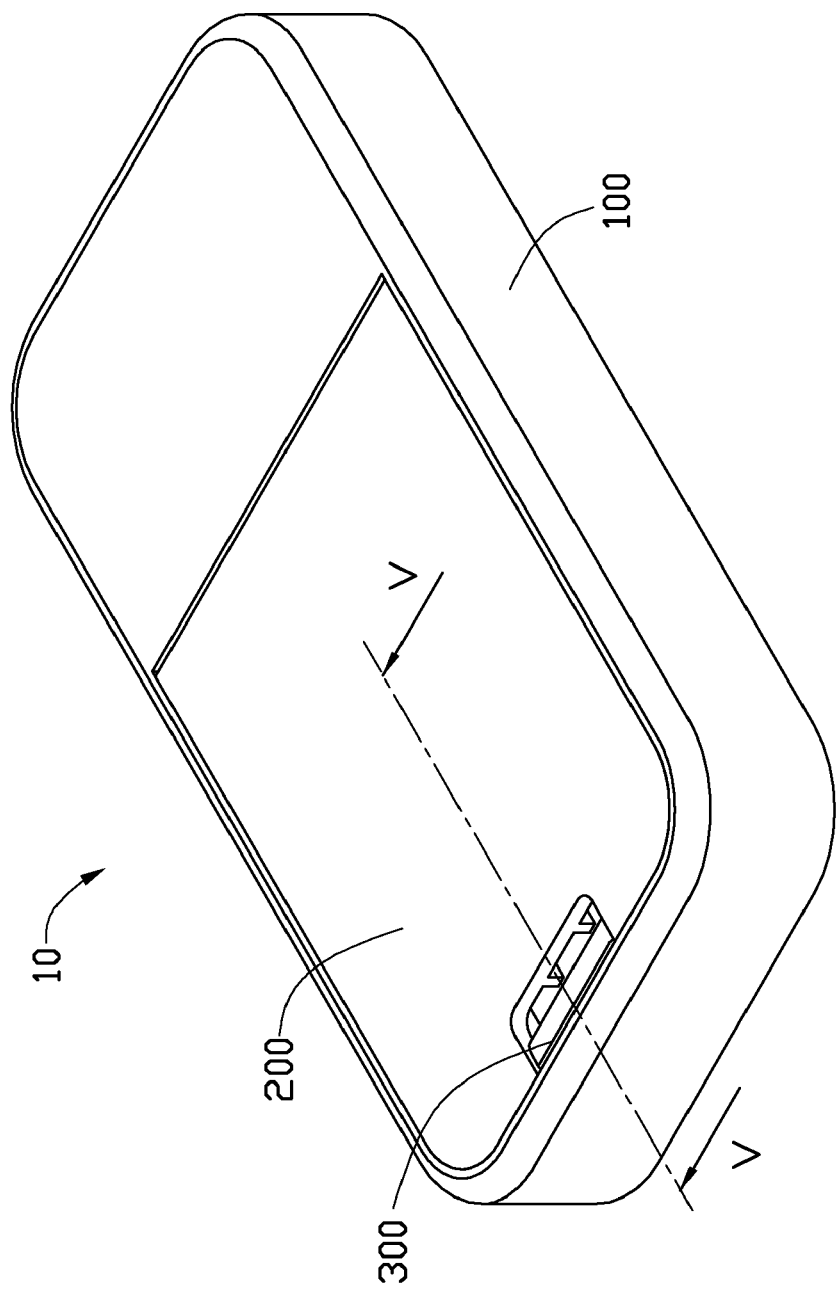
FIG. 1 is an isometric view of the electronic device with the latching device in accordance with an exemplary embodiment.

Referring to FIG. 1, an embodiment of an electronic device 10 is illustrated. The device 10 includes a main body 100, a battery cover 200, and a latching device 300. The battery cover 200 cooperates with the main body 100 to form an interior space for receiving a battery 800 (shown in FIG. 2). The latching device 300 is slidably connected to the battery cover 200 for fastening/securing the battery cover 200 to the main body 100 and also for removing the battery cover 200 from the main body 100.

Figure 2:
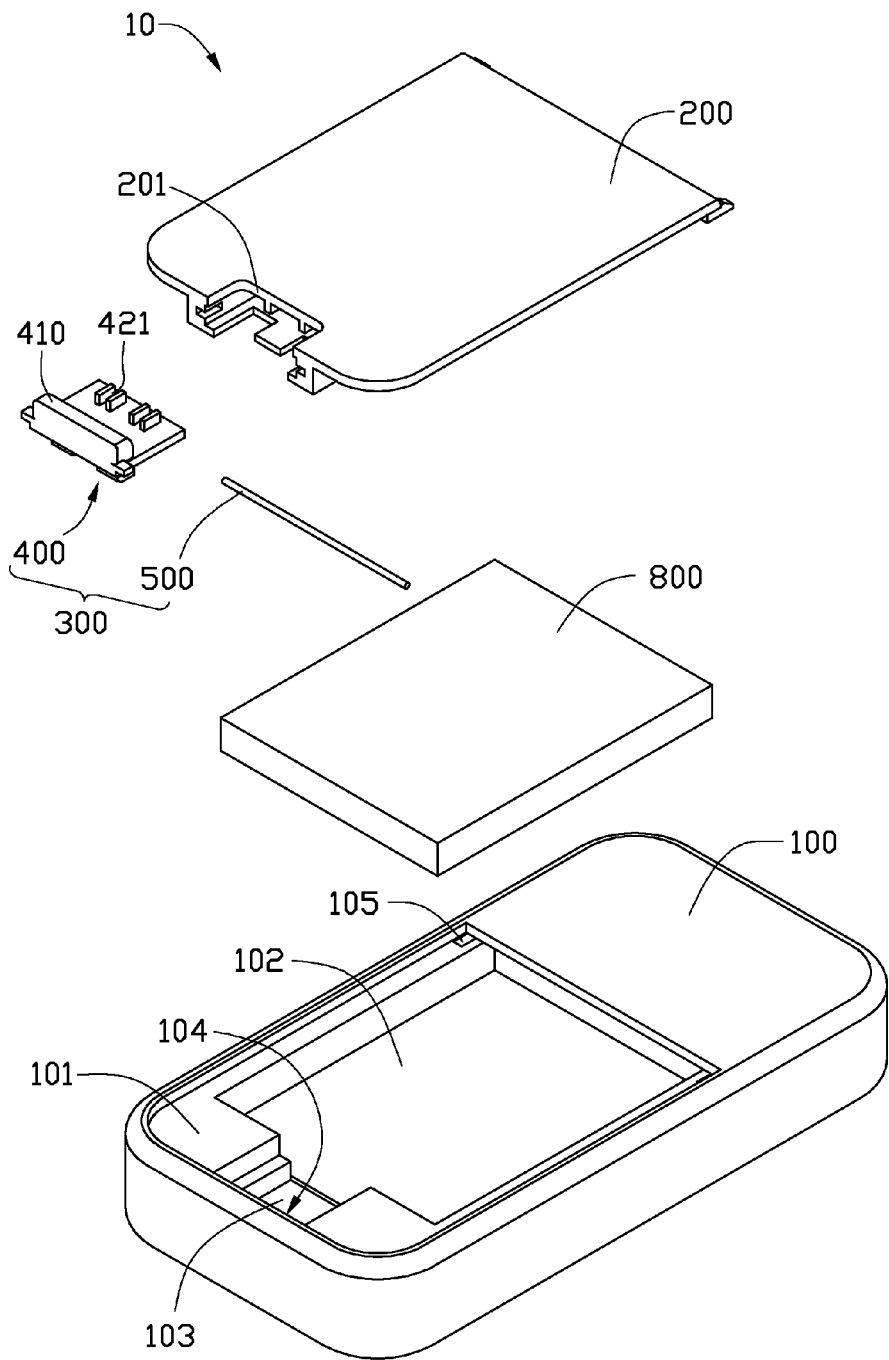
FIG. 2 is an exploded, perspective view of the electronic device of FIG. 1, showing the latching device and a battery cover of the electronic device.

Referring also to FIG. 2, the main body 100 defines a receiving space 101 for receiving the battery cover 200. Also defined in the main body 100 is a battery cavity 102 below and communicating with the receiving space 101 for receiving the battery 800. A recessed portion 103 is defined below and communicating with the receiving space 101 for receiving the latching device 300. A pair of latching portions 113 (see FIG. 5) protrudes from a sidewall 104 of the recessed portion 103. The latching portions 113 cooperate with the latching device 300 to secure the battery cover 200 to the main body 100. A pair of apertures 105 is formed on the main body 100 at a bottom area of the receiving space 101. The apertures 105 are far away from the recessed portion 103 and adjacent to two opposite sidewalls of the battery cavity 102, respectively.

Figure 3:
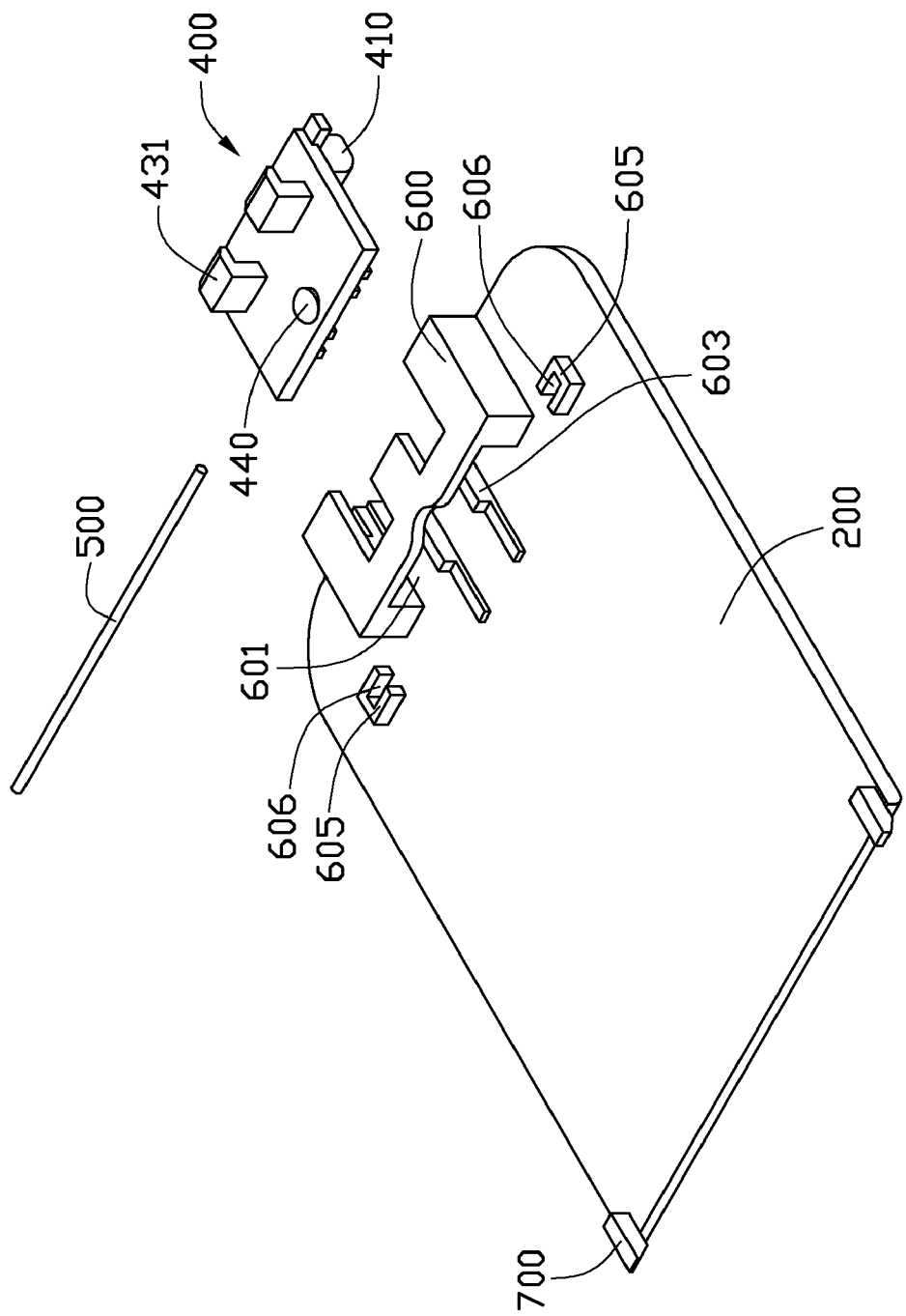
FIG. 3 is partial view similar to FIG. 2, but viewed from another perspective.

An opening 201 corresponding to the recessed portion 103 is defined in one end of the battery cover 200. Referring also to FIG. 3, a retaining protrusion 600 corresponding to the recessed portion 103 protrudes from the bottom of the battery cover 200. A pair of positioning protrusions 700 corresponding to the apertures 105 protrudes from the bottom surface of the battery cover 200.

A portion of the latching device 300 is exposed to the battery cover 200 via the opening 201. The exposed portion of the latching device 300 is provided for users to slide the latching device 300.

The retaining protrusion 600 can be received in the recessed portion 103. The retaining protrusion 600 defines a slot 601 extending through the retaining protrusion 600. The slot 601 communicates with the opening 201. A portion of the latching device 300 extends through the slot 601 and hooks onto the retaining protrusion 600. A pair of sliding rails 603 protrudes from the bottom surface of the battery cover 200. The sliding rails 603 are spaced from each other and extend through the slot 601. A pair of stopper portions 605 protrudes from the bottom of the battery cover 200. The stopper portions 605 are adjacent to the sliding rails 603, respectively. Each of the stopper portions 605 defines a groove 606.

The positioning protrusions 700 are spaced from each other and away from the retaining protrusions 600. The positioning protrusions 700 can be received in the apertures 105 to secure the battery cover 200 to the main body 100.

Figure 4:
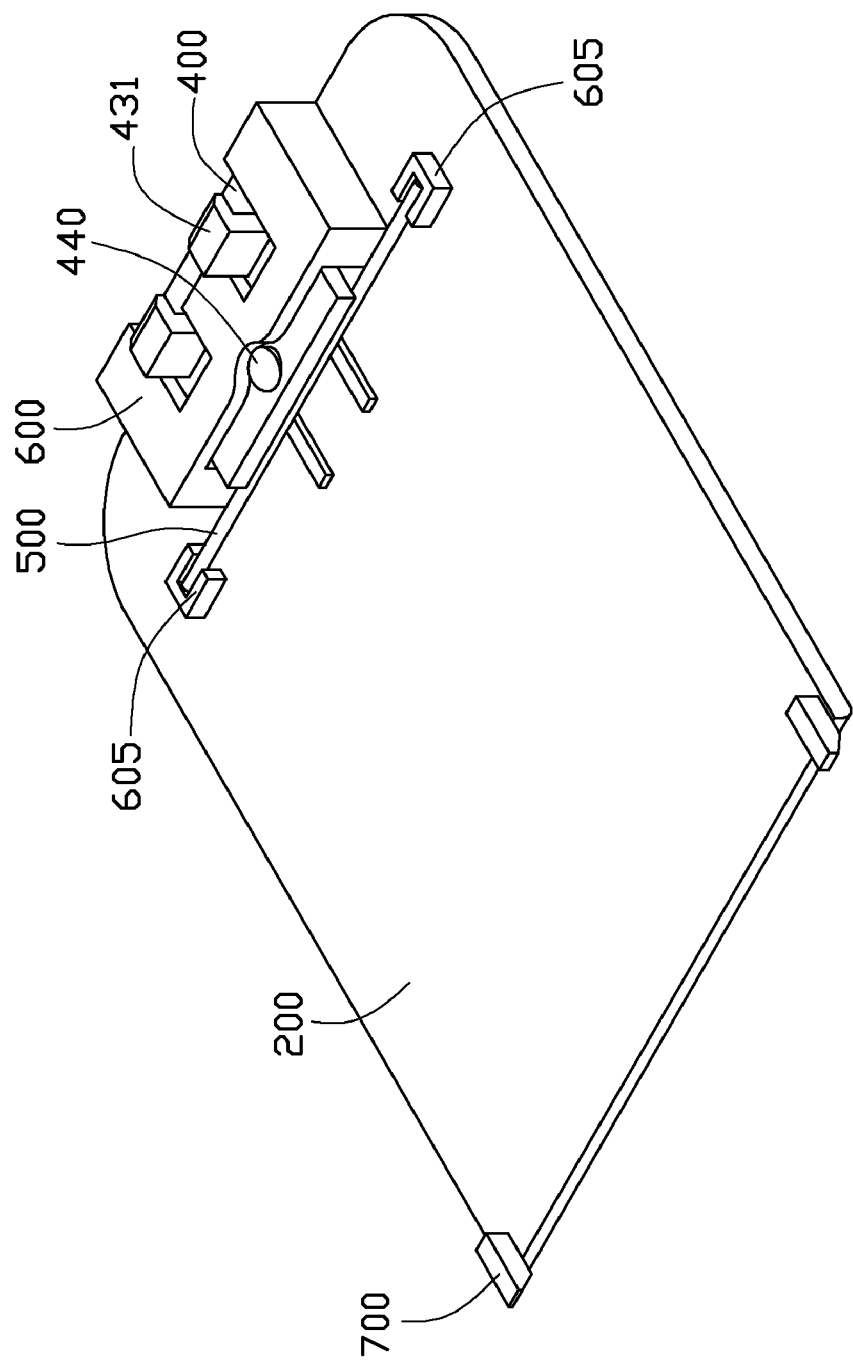
FIG. 4 is an isometric view of the latching device and the battery cover of FIG. 3, showing the latching device mounted on the battery cover.

Referring also to FIG. 4, the latching device 300 includes a latching member 400 and an elastic member 500.

An operation portion 410 protrudes from the top of the latching member 400. The operation portion 410 is exposed to users via the opening 201. The exposed portion of the operation portion 410 is provided for the users to slide the latching member 400. A pair of guiding portions 421 protrudes from the top of the latching member 400. Each of the guiding portions 421 can slide along the sliding rail 603. A pair of hook portions 431 corresponding to the latching portions 113 protrudes from the bottom of the latching member 400. When the hook portions 431 hook the latching portions 113, the battery cover 200 is secured to the main body 100. An elastic projection 440 protrudes from the bottom of the latching member 400. A portion of the latching member 400 can extend through the slot 601 when the elastic projection 440 is in a deformed state. After a portion of the latching member 400 extends through the slot 601, the elastic projection 440 resumes its natural state to hook onto the retaining protrusion 600, thus the latching member 400 cannot slide out from the battery cover 200.

Two opposite ends of the elastic member 500 are respectively received in the grooves 606. The elastic member 500 is further pressed by the top of the latching member 400. Because of being limited by the grooves 606 and being pressed by the latching member 400, the elastic member 500 cannot slide out from the battery cover 200.

Figure 5:
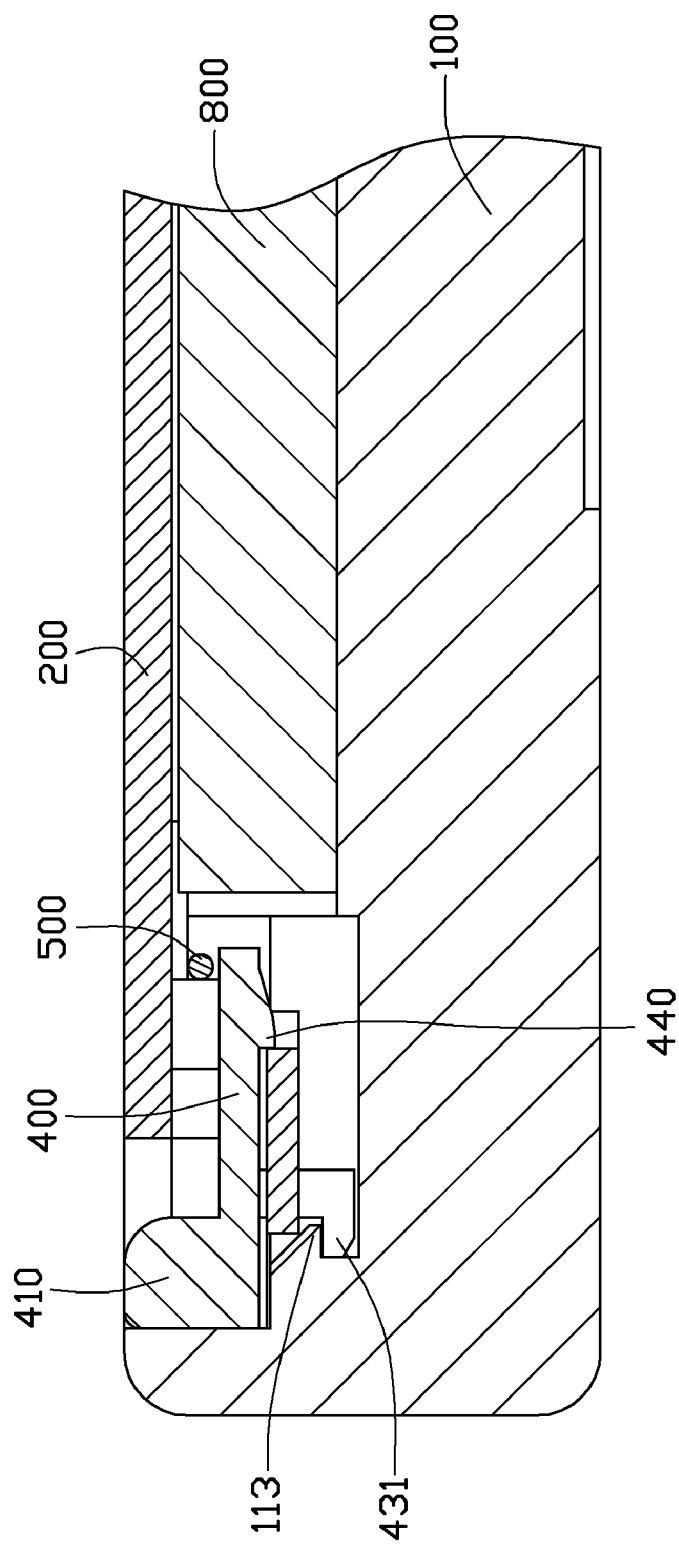
FIG. 5 is a partial, cross-sectional view of the electronic device of FIG. 1, showing the battery cover locked to a main body of the electronic device.

Referring also to FIG. 5, when securing the battery cover 200 to the main body 100, the positioning protrusions 700 are respectively put in the apertures 105, and the battery cover 200 is pressed towards the main body 100. When the battery cover 200 is pressed to the main body 100, the operation portion 410 is pushed to slide the latching member 400 along the sliding slots 603 till the guiding portions 421 resists the elastic member 500 to cause the elastic member to be deformed. When the elastic member 500 is deformed, the latching member 400 can be pressed to be received in the recessed portion 103. When the latching member 400 is received in the recessed portion 103, pressure from the movement of the latching member 400 stops, thus the elastic member 500 resumes its natural state, and the hook portions 431 hook the latching portions 113 under the spring force of the elastic member 500.

Figure 6:
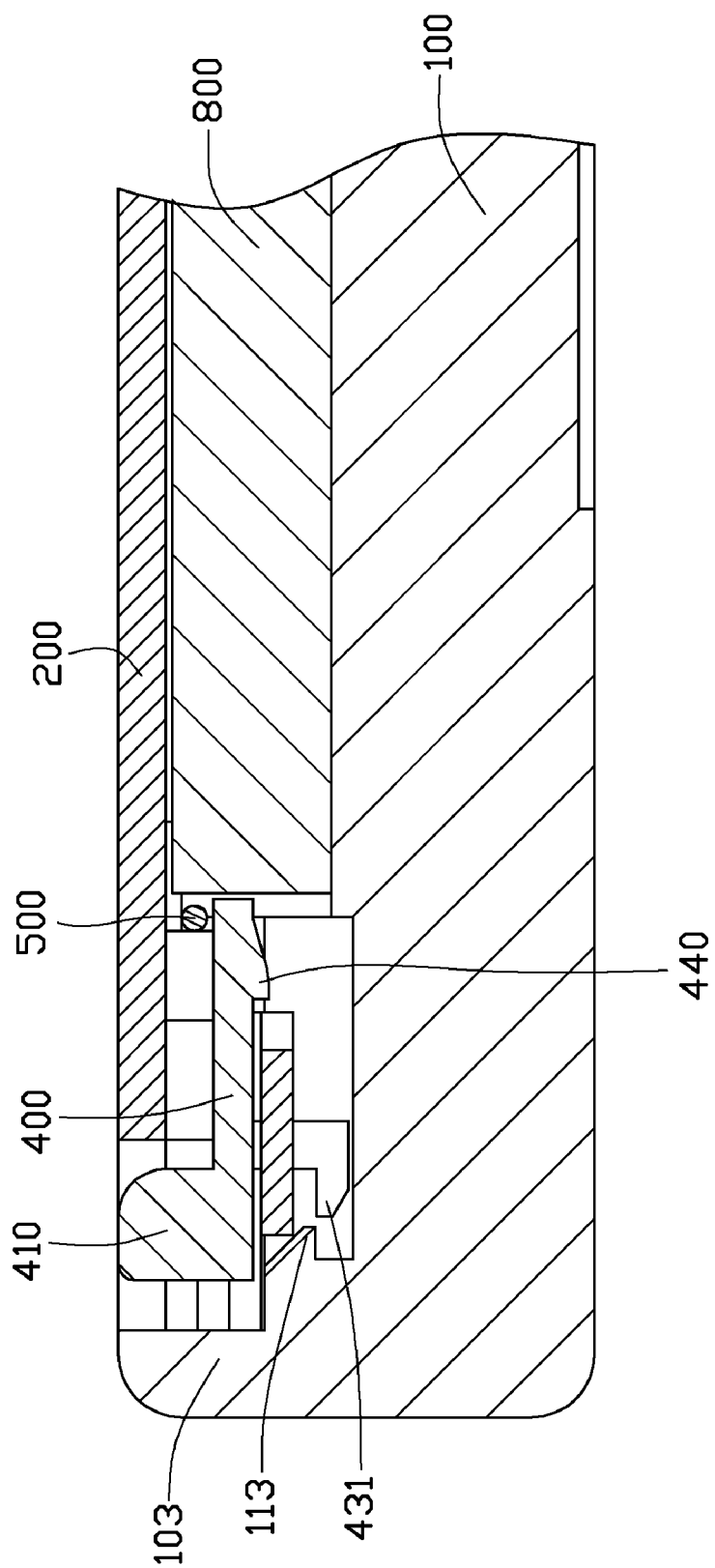
FIG. 6 is similar to FIG. 5 but showing the battery cover unlocked so it can be removed from the main body of the electronic device.

Referring also to FIG. 6, when the battery cover 200 is being removed from the main body 100, the operation portion 410 is pushed to slide the latching member 400 till the hook portions 431 disengage from the latching portions 113. When the hook portions 431 disengage from the latching portions 113, the battery cover 200 can be removed from the main body 100 by pulling the operation portion 410 away from the main body 100.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A latching device applied in an electronic device comprising a battery cover and a main body, comprising:
    an elastic member mounted on a bottom of the battery cover facing the main body; and
    a latching member slidably connected to one end of the battery cover; wherein the latching member comprises an operation portion, an elastic projection, and at least one hook portion, the operation portion is exposed to users for sliding the latching member, and the at least one hook portion faces the main body and is configured for hooking the main body when the battery cover covers the main body
    wherein when the elastic projection is in a deformed state, the latching member can pass through a slot defined by a retaining protrusion protruding from the bottom of the battery cover; when the latching member passes through the slot, the elastic projection resumes its natural state to hook the latching member onto the retaining protrusion; when the battery cover is pressed to cover the main body, the operation portion is pushed to slide the latching member along the battery cover and the elastic member is deformed by the slide of the latching member, and when the battery cover covers the main body, the push of the operation portion is removed, thus the elastic member resumes its natural state, and the at least one hook portion hooks the main body under the spring force of the elastic member.

2. The latching device as described in claim 1, wherein at least one guiding portion protrudes from the latching member facing the main body, and when the operation portion is pushed to slide the latching member, the at least one guiding portion resists the elastic member to cause the elastic member to be deformed.

3. An electronic device comprising:
    a battery cover;
    a main body;
    an elastic member mounted on a bottom of the battery cover facing the main body; and
    a latching member slidably connected to the battery cover, wherein the latching member comprises an operation portion and at least one hook portion, the operation portion is exposed to users for sliding the latching member, and the at least one hook portion faces the main body and is configured for hooking the main body when the battery cover covers the main body;
    wherein a recessed portion is formed on the main body for receiving the latching member; a retaining protrusion corresponding to the recessed portion protrudes from the bottom of the battery cover; the retaining protrusion defines a slot; an elastic projection protruded from the latching member; when the elastic projection is in a deformed state, the latching member can pass through the slot, and when the latching member passes through the slot, the elastic projection resumes its natural state to hook the latching member onto the retaining protrusion; when the battery cover is pressed to cover the main body, the operation portion is pushed to slide the latching member along the battery cover and the elastic member is deformed by the slide of the latching member, and when the battery cover covers the main body, the push of the operation portion is removed, thus the elastic member resumes its natural state, and the at least one hook portion hooks the main body under the spring force of the elastic member.

4. The electronic device as described in claim 3, wherein the battery cover defines an opening, the operation portion is exposed to the users via the opening.

5. The electronic device as described in claim 3, wherein at least one latching portion corresponding to the at least one hook portion protrudes from a sidewall of the recessed portion, and when the at least one hook portion hooks the at least one latching portion, the battery cover is secured to the main body.

6. The electronic device as described in claim 3, wherein at least one sliding rail protrudes from the bottom of the battery cover extending through the slot, at least one guiding portion corresponding to the at least one sliding rail protrudes from the latching member, and the at least one guiding portion can slide along the at least one sliding rail.

7. The electronic device as described in claim 6, wherein when the operation member is pushed to slide along at least one sliding slot, the at least one guiding portion resists the elastic member to cause the elastic member to be deformed.

8. The electronic device as described in claim 6, wherein a pair of stopper portions protrudes from the bottom of the battery cover, the stopper portions are respectively adjacent to two opposite sidewalls of the at least one sliding rail, and the elastic member is fixed by the stopper portions.

9. The electronic device as described in claim 3, wherein at least one positioning protrusion protrudes from the bottom of the battery cover, the bottom of the main body defines at least one aperture corresponding to the at least one positioning protrusion, and when the battery cover covers the main body, the at least one positioning protrusion is received in the at least one aperture.

\* \* \* \* \*